United States Patent
Endo et al.

(10) Patent No.: US 9,287,054 B2
(45) Date of Patent: Mar. 15, 2016

(54) SOLID ELECTROLYTIC CAPACITOR ELEMENT, METHOD FOR MANUFACTURING SAME, AND CONDUCTIVE PASTE

(71) Applicants: Takashi Endo, Ome (JP); Tomeji Ohno, Yokohama (JP); Masami Akagi, Ome (JP); Tomoko Uchida, Ome (JP)

(72) Inventors: Takashi Endo, Ome (JP); Tomeji Ohno, Yokohama (JP); Masami Akagi, Ome (JP); Tomoko Uchida, Ome (JP)

(73) Assignee: SHOEI CHEMICAL INC., Shinjuku-ku, Tokyo (JP)

(*) Notice: Subject to any disclaimer, the term of this patent is extended or adjusted under 35 U.S.C. 154(b) by 100 days.

(21) Appl. No.: 14/366,228

(22) PCT Filed: Nov. 27, 2012

(86) PCT No.: PCT/JP2012/080540
§ 371 (c)(1),
(2) Date: Jun. 17, 2014

(87) PCT Pub. No.: WO2013/111438
PCT Pub. Date: Aug. 1, 2013

(65) Prior Publication Data
US 2014/0334071 A1      Nov. 13, 2014

(30) Foreign Application Priority Data
Jan. 27, 2012   (JP) ................. 2012-014708

(51) Int. Cl.
  H01G 9/042   (2006.01)
  H01G 9/00    (2006.01)
  H01G 9/025   (2006.01)
  H01G 9/15    (2006.01)

(52) U.S. Cl.
  CPC ............ *H01G 9/042* (2013.01); *H01G 9/0029* (2013.01); *H01G 9/0036* (2013.01); *H01G 9/025* (2013.01); *H01G 9/0425* (2013.01); *H01G 9/15* (2013.01)

(58) Field of Classification Search
  CPC ... H01G 9/042; H01G 9/0029; H01G 9/0036; H01G 9/025; H01G 9/0425; H01G 9/15
  See application file for complete search history.

(56) References Cited

U.S. PATENT DOCUMENTS

2007/0171596 A1   7/2007  Chacko et al.
2009/0195966 A1   8/2009  Ozawa

FOREIGN PATENT DOCUMENTS

| EP | 2 251 880 A1 | 11/2010 |
| JP | 2004-168966 A | 6/2004 |
| JP | 2008-004583 A | 1/2008 |
| JP | 2009-290088 A | 12/2009 |

OTHER PUBLICATIONS

International Search Report for PCT/JP2012/080540 (1 page).
Supplementary European Patent Office Search Report dated Oct. 9, 2015 (9 pages).
Methods for the calculation of surface free energy of solids, by M. Zenkiewicz, Journal of Achievements in Materials and Manufacturing Engineering, vol. 24, Issue 1, Sep. 2007, pp. 137-145.

*Primary Examiner* — David M Sinclair
(74) *Attorney, Agent, or Firm* — Flynn, Thiel, Boutell & Tanis, P.C.

(57) ABSTRACT

Provided is a solid electrolytic capacitor element which is reduced in ESR deterioration due to thermal shock and suppressed in variation in ESR changes, while having good initial characteristics of ESR. This solid electrolytic capacitor element is provided, on the surface of an anode body, with at least a dielectric layer, a solid electrolyte layer, a carbon layer that contains a first resin component and a conductive layer that contains a second resin component. Both of the first resin component and the second resin component have a hydroxyl group, and the difference $\Delta\gamma^h$ ($=\gamma^h_2-\gamma^h_1$) between the hydrogen-bonding component value $\gamma^h_1$ [mN/m] of the carbon layer surface and the hydrogen-bonding component value $\gamma^h_2$ [mN/m] of the conductive layer surface is within the range of $-3 \leq \Delta\gamma^h \leq 3$ [mN/m].

7 Claims, 1 Drawing Sheet

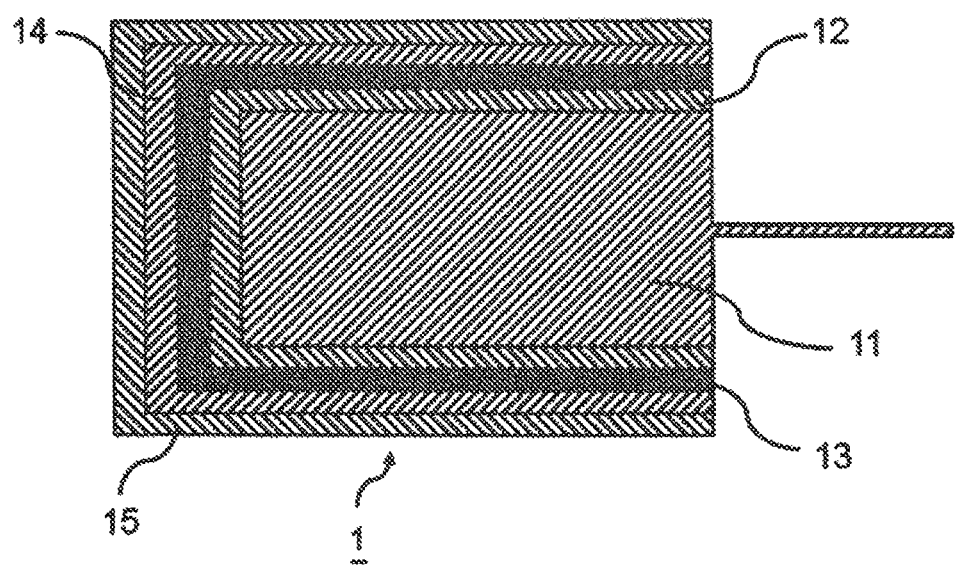

SOLID ELECTROLYTIC CAPACITOR ELEMENT, METHOD FOR MANUFACTURING SAME, AND CONDUCTIVE PASTE

TECHNICAL FIELD

The present invention relates to a solid electrolytic capacitor element, a method for its manufacture, and a conductive paste, and more particularly relates to a solid electrolytic capacitor element that provides a suppression of thermal shock-induced deterioration in the equivalent series resistance (ESR), little variation in the ESR changes among individual products, and excellent yields.

BACKGROUND ART

An example of a solid electrolytic capacitor element is shown in FIG. 1. The solid electrolytic capacitor element 1 in FIG. 1 has a structure that contains a solid electrolyte layer 13, a carbon layer 14, and a conductive layer 15 on an oxide film 12 that has been formed on the surface of a sintered body 11 produced by sintering a valve action metal such as tantalum, niobium, titanium, or aluminum. This sintered body 11 is used as an anode body, while the oxide film 12 is used as a dielectric layer. The carbon layer 14 and the conductive layer 15 residing on the solid electrolyte layer 13 are used as a cathode.

The oxide film 12 is preferably provided by oxidation of the sintered body itself, but may be an oxide other than this.

Manganese dioxide or a conductive polymer is widely used as the solid electrolyte layer 13.

The carbon layer 14 is generally formed by applying and drying a carbon paste that has been prepared by dispersing a carbon powder in a vehicle that contains a resin (also referred to as a binder resin) and a solvent. It is thought that this carbon layer 14 can lower the contact resistance between the solid electrolyte layer 13 and the conductive layer 15 and lower the ESR.

The conductive layer 15 is generally formed by applying, and drying and/or curing a conductive paste that has been prepared by dispersing a metal powder, e.g., of silver, in a vehicle.

Such solid electrolytic capacitor elements provided with a carbon layer and a conductive layer, as described in Patent Document 1 and Patent Document 2, are already widely known.

PRIOR ART DOCUMENTS

Patent Documents

Patent Document 1: Japanese Patent Publication No. 2004-168966 A
Patent Document 2: Japanese Patent Publication No. 2008-004583 A

SUMMARY OF THE INVENTION

Problem to be Solved by the Invention

Accompanying the size reduction, digitalization, and reduction in power consumption of electronic devices in recent years, there has been strong desire for a reduction in the equivalent series resistance (ESR) of the solid electrolytic capacitor elements used in these devices.

In addition to the desire for a low ESR as an initial characteristic for a solid electrolytic capacitor element, there is also desire that ESR changes with time and the thereby produced variation in the ESR of the individual products (individual elements) be reduced. That is, the ESR of a solid electrolytic capacitor element may be changed not only by thermal shock during production of the element, but also by subsequent thermal history. For example, the ESR may deteriorate (increase) during the multiple thermal drying steps that are carried out during element production and during an ensuing reflow soldering, and also due to the heat generated during use after completion of the final product. It is undesirable from the standpoint of quality control for the extent of this change to be substantially different from element to element and for there to be an increasing variation in ESRs with elapsed time.

In order to solve these problems with deterioration and variation in the ESR, individual improvements have been attempted for each of the layers in solid electrolytic capacitor elements, for example, the carbon layer and the conductive layer; however, satisfactory results have not been obtained.

In view of this background, the present inventors investigated improvements to each layer and also carried out repeated investigations and numerous experiments into combinations of the individual layers and in particular combinations of the carbon layer and the conductive layer, and as a result achieved the present invention.

That is, the present invention was pursued in order to solve the problems described above, and an object of the present invention is therefore to provide a solid electrolytic capacitor element that not only exhibits excellent initial characteristics of ESR, but that also exhibits little thermal shock-induced deterioration in ESR and exhibits a suppression of the variation in ESR changes.

Means to Solve the Problem

The present invention, which solves the problems cited above, is characterized by the following.

(1) A solid electrolytic capacitor element which is provided, on a surface of an anode body, with at least a dielectric layer, a solid electrolyte layer, a carbon layer containing a first resin component, and a conductive layer containing a second resin component, wherein
the first resin component and the second resin component both contain a hydroxyl group and
the difference $\Delta\gamma^h$ ($=\gamma^h_2-\gamma^h_1$) between the hydrogen-bonding component value $\gamma^h_1$ [mN/m] of the surface of the carbon layer and the hydrogen-bonding component value $\gamma^h_2$ [mN/m] of the surface of the conductive layer is within the range of $-3 \leq \Delta\gamma^h \leq 3$ [mN/m].

(2) The solid electrolytic capacitor element according to the above (1), wherein the first resin component and/or the second resin component is at least one selected from the group consisting of butyral resins, acrylic resins, epoxy resins, phenoxy resins, phenol resins, amino resins, and urethane resins.

(3) The solid electrolytic capacitor element according to the above (1) or (2), wherein the conductive layer includes silver as a conductive component.

(4) A method of manufacturing a solid electrolytic capacitor element which is provided with, on a surface of an anode body, at least a dielectric layer, a solid electrolyte layer, a carbon layer, and a conductive layer,
the method including:
a step of forming the carbon layer using a carbon paste containing a hydroxyl group-containing first binder resin; and a step of forming, on the carbon layer, the conductive layer using a conductive paste containing a hydroxyl group-containing second binder resin, wherein the carbon paste and the conductive paste are used in combination so that the difference $\Delta\gamma^h$ ($=\gamma^h_2-\gamma^h_1$) between the hydrogen-bonding component value $\gamma^h_1$ [mN/m] of the surface of the carbon layer and the hydrogen-bonding component value $\gamma^h_2$ [mN/m] of the surface of the conductive layer is within the range of $-3 \leq \Delta\gamma^h \leq 3$ [mN/m].

(5) The manufacturing method according to (4), wherein the first binder resin and/or the second binder resin is at least one selected from the group consisting of butyral resins, acrylic resins, epoxy resins, phenoxy resins, phenol resins, amino resins, and compositions that cure to provide urethane resins.

(6) A conductive paste for forming, in a solid electrolytic capacitor element, a conductive layer that is disposed on a carbon layer that contains a hydroxyl group-containing resin component, wherein a binder resin contained in the conductive paste has a hydroxyl group, and when $\gamma^h_1$ [mN/m] is the hydrogen-bonding component value of the surface of the carbon layer and $\gamma^h_2$ [mN/m] is the hydrogen-bonding component value of the surface of the conductive layer, the difference $\Delta\gamma^h$ ($=\gamma^h_2-\gamma^h_1$) between these hydrogen-bonding component values is within the range of $-3 \leq \Delta\gamma^h \leq 3$ [mN/m].

(7) The conductive paste according to the above (6), wherein the binder resin is at least one selected from the group consisting of butyral resins, acrylic resins, epoxy resins, phenoxy resins, phenol resins, amino resins, and compositions that cure to provide urethane resins.

Advantageous Effects of the Invention

The present invention can provide a solid electrolytic capacitor element that exhibits less deterioration in ESR than conventional products, even when subjected to a long-term high-temperature loading test, and that also exhibits a suppression of variation in ESR changes with time among individual products.

BRIEF DESCRIPTION OF THE DRAWINGS

FIG. 1 is a diagram that shows an example of a solid electrolytic capacitor element.

EMBODIMENTS TO CARRY OUT THE INVENTION

The present invention can be applied to solid electrolytic capacitor elements that have a carbon layer and a conductive layer and is described below referring to the example of application to the solid electrolytic capacitor element shown in FIG. 1.

In this specification, the "binder resin" refers to the resin present in the undried/uncured paste and is distinct from the "resin component" that is present in the layer formed by the drying and/or curing of such a paste. In the following, the "first resin component" refers to the resin present in the layer provided by the drying and/or curing of the paste containing the "first binder resin", while the "second resin component" refers to the resin present in the layer provided by the drying and/or curing of the paste containing the "second binder resin".

The carbon layer 14 contains a carbon powder and a first resin component. There are no limitations on the carbon powder that can be used in the present invention, but graphite powder is preferred since it is generally used in solid electrolytic capacitor elements.

A carbon paste is prepared by dispersing the carbon powder uniformly in a vehicle that contains a first binder resin and a solvent. The carbon layer is obtained by coating this carbon paste on the solid electrolyte layer 13 and subsequently drying and/or curing it.

The conductive layer 15 contains a metal powder and a second resin component. A conductive paste is prepared by dispersing the metal powder uniformly in a vehicle that contains a second binder resin and a solvent. The conductive layer is obtained by coating this conductive paste on the carbon layer 14 (or the carbon paste layer prior to drying and/or curing) and subsequently drying and/or curing it.

There are no limitations on the metal powder that can be used in the present invention; however, viewed from the perspective of conductivity and cost, the use is preferred of silver powder, or a composite powder formed by coating silver on the surface of particles of any one or two or more non-silver metals such as copper, nickel, aluminum, and so forth, or an alloy powder of silver with any one or two or more of the aforementioned non-silver metals (hereinafter, these powders are collectively referred to as "silver-based powder"). A conductive layer containing silver as a conductive component can be obtained by the use of the silver-based powder, and when a non-silver metal as indicated above is present in the silver-based powder, this means that the "conductive layer containing silver as a conductive component" is a conductive layer that also contains this non-silver metal. Only one selected from these silver-based powders, or a mixture of two or more selected from these silver-based powders, or a mixture of the silver-based powder with another conductive powder, e.g., of palladium, platinum, copper, a metal oxide, and so forth, may be used for the metal powder in the present invention.

In addition to the preceding, the carbon paste and the conductive paste may generally incorporate, for example, an inorganic filler and/or an additive, e.g., surfactant, antifoam agent, plasticizer, dispersing agent, and so forth, which are incorporated as appropriate on an optional basis. The addition of these additives and so forth makes it possible to adjust the printing properties and the properties of the film that is formed.

Both the first resin component present in the carbon layer and the second resin component present in the conductive layer have hydroxyl groups in the present invention. When either or both of these resin components do not contain the hydroxyl group, the value of the contact resistance after heat-cycle testing increases and the ESR deteriorates.

In order for both the first and second resin components to contain a hydroxyl group, one or two or more hydroxyl group-bearing binder resins are used for the first and second binder resins that are used respectively in the carbon paste and conductive paste. Such binder resins can be exemplified by butyral resins such as BH-S and KS-5 from the Sekisui Chemical Co., Ltd.; acrylic resins such as Hitaloid 6500 from Hitachi Chemical Company, Ltd., and 8AT-935 and 8UA series 146, 301, 318, 347, and 366 from Taisei Fine Chemical Co., Ltd.; epoxy resins such as Epotohto YR207 and YDF-2001 from the new Nippon Steel Chemical Co., Ltd., R-53 from Nagashima Special Paint Co., Ltd., and Epikote 1001 from Mitsubishi Chemical Corporation; phenoxy resins such as YP-50 and YP-70 from the new Nippon Steel Chemical Co., Ltd.; phenol resins such as PL-2222 from Gunei Chemical Industry Co., Ltd.; amino resins such as urea resins P-138, P-196M, and G-1850 from the DIC Corporation and the melamine resins U-VAN 20SE, 22R, and 80S from Mitsui Chemicals, Inc.; and also compositions that cure into urethane resins (for example, compositions that contain an epoxy-modified polyol resin, e.g., Epiclon H-201 from the DIC Corporation and a blocked isocyanate, e.g., D-550 from the DIC Corporation).

In order to improve the ESR deterioration and the variation in ESR changes with time among individual products, in particular the amount of hydroxyl groups in the first and second resin components is each preferably 2 to 10% by weight with reference to the total amount of the corresponding resin component. An excellent improvement is obtained by using such a resin component, but without producing problems such as deterioration in a loss of moisture resistance of the coated film and increase in the leakage current.

The present invention also includes embodiments in which the carbon layer and/or conductive layer is formed by admixing a hydroxyl group-free binder resin with the hydroxyl group-containing binder resin and drying/curing a paste that contains such mixed resins. In such a case, the hydroxyl group-free binder resin is preferably less than 30% by weight and more preferably less than 10% by weight with respect to the total amount of the binder resins in each paste.

By controlling/adjusting—among the properties exhibited by the carbon layer and conductive layer, which are in contact with each other—the difference between the hydrogen-bonding component values $\gamma^h$ for the solid surfaces of the two layers to within the range indicated below, the present invention can provide improvements in the deterioration and variation in contact resistance values and thus can provide improvements in the deterioration and variation in ESR.

The hydrogen-bonding component value $\gamma^h$ can be determined by the Owens-Wendt method. In specific terms, two liquids having a known surface energy $\gamma_L$, dispersive component value $\gamma^d_L$, and hydrogen-bonding component value $\gamma^h_L$ are dripped onto each surface, i.e., the carbon layer and conductive layer; the contact angles θ are measured; and the hydrogen-bonding component value $\gamma^h_S$ and dispersive component value $\gamma^d_S$ of the solid surface are determined by solving the simultaneous equations obtained from the following Equation (1).

$$\gamma_L \cdot (1+\cos\theta) = 2(\gamma^d_L \cdot \gamma^d_S)^{1/2} + 2(\gamma^h_L \cdot \gamma^h_S)^{1/2} \qquad \text{Equation (1)}$$

In the examples provided below, the contact angle θ was measured using a goniometer-type contact angle measuring device (Model G-1 made by Eruma Corporation) and using water ($\gamma_L$=72.8 mN/m, $\gamma^d_L$=21.8 mN/m, $\gamma^h_L$=51.0 mN/m) and methylene iodide ($\gamma_L$=50.8 mN/m, $\gamma^d_L$=49.5 mN/m, $\gamma^h_L$=1.3 mN/m) as the two liquids having a known surface energy $\gamma_L$, dispersive component value $\gamma^d_L$, and hydrogen-bonding component value $\gamma^h_L$. In addition, when the hydrogen-bonding component value $\gamma^h_S$ of the surface of the carbon layer is $\gamma^h_1$ and its dispersive component value $\gamma^d_S$ is $\gamma^d_1$ and when the hydrogen-bonding component value $\gamma^h_S$ of the surface of the conductive layer is $\gamma^h_2$ and its dispersive component value $\gamma^d_S$ is $\gamma^d_2$, each of the values $\gamma^h_1$, $\gamma^d_1$, $\gamma^h_2$, and $\gamma^d_2$ were determined from the simultaneous equations obtained by substitution of the values given above into Equation (1).

As a result, the present inventors discovered that the deterioration and variation in the contact resistance values and thus the deterioration and variation in the ESR were improved when the difference $\Delta\gamma^h$ ($=\gamma^h_2 - \gamma^h_1$) between the hydrogen-bonding component value $\gamma^h_1$ of the surface of the carbon layer and the hydrogen-bonding component value $\gamma^h_2$ of the surface of the conductive layer satisfied $-3 \leq \Delta\gamma^h \leq 3$ [m/Nm], and thus achieved the present invention.

As indicated below, the present inventors also carried out the same investigations into the dispersive component value $\gamma^d$ and the surface free energy $\gamma$ ($=\gamma^h+\gamma^d$), but in particular were unable to find a correlation with or influence on the contact resistance value or the ESR and did not observe the dispersive component value $\gamma^d$ or the surface free energy $\gamma$ to be effective as control factors for the present invention. The present invention was achieved through the discovery that the hydrogen-bonding component value $\gamma^h$ is a very effective control factor for improving the contact resistance value and ESR in the present invention, and a characteristic feature of the present invention is therefore the use of the hydrogen-bonding component value $\gamma^h$ as a control factor.

The hydrogen-bonding component value $\gamma^h$ for each of the carbon layer surface and the conductive layer surface also varies with the carbon powder and metal powder contained in the carbon paste and conductive paste and the optionally incorporated additives and thus cannot be categorically specified; however, it can be adjusted through the type of binder resin contained in the paste, the content of polar groups (e.g., amino group, carboxyl group, hydroxyl group, acetyl group, and so forth) in the binder resin, and whether or not a surface treatment (for example, a hydrophobing treatment) has been executed on the carbon powder and the metal powder.

Aside from preparing the carbon paste and the conductive paste in combination that satisfy the requirements indicated in the preceding, the solid electrolytic capacitor element of the present invention can be manufactured by forming the sintered body 11, oxide film 12, solid electrolyte layer 13, carbon layer 14, and conductive layer 15 as in the same manner as conventionally done.

EXAMPLES

Preparation of the Conductive Paste

Ten kinds of silver powder-containing silver pastes as described in the following were prepared as the conductive pastes.

[Sample A-1]

A silver paste A-1 was prepared by kneading and stirring the following using a three-roll mill: 53.0% by weight of silver powder, 30.0% by weight of a varnish in which a butyral resin (1:1 mixture of BH-S from Sekisui Chemical Co., LTD. and KS-5 from Sekisui Chemical Co., LTD.) was dissolved in benzyl alcohol to provide a resin solid content of 15% by weight, and 17.0% by weight of propylene glycol methyl ether acetate.

[Sample A-2]

A silver paste A-2 was prepared by kneading and stirring the following using a three-roll mill: 53.0% by weight of silver powder, 30.0% by weight of a varnish in which a butyral resin (KS-5) was dissolved in benzyl alcohol to provide a resin solid content of 15% by weight, and 17.0% by weight of propylene glycol methyl ether acetate.

[Sample A-3]

A silver paste A-3 was prepared by kneading and stirring the following using a three-roll mill: 53.0% by weight of silver powder, 30.0% by weight of a varnish in which a butyral resin (BH-S:KS-5=1:1) was dissolved in benzyl alcohol to provide a resin solid content of 15% by weight, 1.0% by weight of acrylic resin (8AT-935 from Taisei Fine Chemical Co., Ltd.), and 16.0% by weight of propylene glycol methyl ether acetate.

[Sample A-4]

A silver paste A-4 was prepared by kneading and stirring the following using a three-roll mill: 53.0% by weight of silver powder, 30.0% by weight of a varnish in which a butyral resin (KS-5) was dissolved in benzyl alcohol to provide a resin solid content of 15% by weight, 1.0% by weight of acrylic resin (8AT-935), and 16.0% by weight of propylene glycol methyl ether acetate.

[Sample A-5]

A silver paste A-5 was prepared by kneading and stirring the following using a three-roll mill: 42.0% by weight of silver powder, 9.5% by weight of a phenol resin (PL-4222 from Gunei Chemical Industry Co., Ltd.), 30.0% by weight of a varnish in which a butyral resin (KS-5) was dissolved in benzyl alcohol to provide a resin solid content of 15% by weight, 1.0% by weight of epoxy resin (Epotohto YR207 from the new Nippon Steel Chemical Co., Ltd.), and 17.5% by weight of propylene glycol methyl ether acetate.

[Sample A-6]

A silver paste A-6 was prepared by kneading and stirring the following using a three-roll mill: 71.0% by weight of silver powder, 5.5% by weight of an epoxy-modified polyol resin (Epiclon H-201 BT60 from the DIC Corporation), 7.5% by weight of a blocked isocyanate (D-550 from the DIC Corporation), and 16.0% by weight of terpineol.

[Sample A-7]

A silver paste A-7 was prepared by kneading and stirring the following using a three-roll mill: 73.5% by weight of silver powder, 9.0% by weight of a melamine resin (U-VAN 20SE60 from Mitsui Chemicals, Inc.), 4.0% by weight of an epoxy resin (R-53 from Nagashima Special Paint Co., Ltd.), 1.0% by weight of a curing promoter (Nacure 5225 from King Industries Inc.), and 12.5% by weight of terpineol.

[Sample A-8]

A silver paste A-8 was prepared by kneading and stirring the following using a three-roll mill: 53.0% by weight of silver powder, 30.0% by weight of a varnish in which a polyvinyl acetate resin (PV-500 from Nippon Synthetic Chemical Industry Co., Ltd.) was dissolved in benzyl alcohol to provide a resin solid content of 15% by weight, and 17.0% by weight of propylene glycol methyl ether acetate.

[Sample A-9]

A silver paste A-9 was prepared by kneading and stirring the following using a three-roll mill: 53.0% by weight of silver powder, 30.0% by weight of a varnish in which a polyethylene vinyl acetate resin (NUC-3160 from NUC corporation) was dissolved in benzyl alcohol to provide a resin solid content of 15% by weight, and 17.0% by weight of propylene glycol methyl ether acetate.

[Sample A-10]

A silver paste A-10 was prepared by kneading and stirring the following using a three-roll mill: 66.5% by weight of silver powder, 24.0% by weight of a styrene-butadiene resin (SBR-5 from Fujikura Ohyo-Kako Co., Ltd.), and 9.5% by weight of propylene glycol methyl ether acetate.

Analysis of the Conductive Layer

Each of the prepared samples was coated by screen printing on an alumina substrate and dried and/or cured to form a conductive layer that had a film thickness of approximately 20 μm after drying and/or curing. This was followed by calculation of the hydrogen-bonding component value $\gamma^h_2$ and the dispersive component value $\gamma^d_2$ by the method described above. These results are given in TABLE 1. The presence or absence of hydroxyl group in the resin component was evaluated using a Model 6200 FT-IR Fourier-transform infrared spectrophotometer from the JASCO Corporation based on the presence or absence of the peak around 3500 cm$^{-1}$ of hydroxyl group in the absorption spectrum. These results are also shown in TABLE 1.

TABLE 1

| Silver Paste | Resin Binder | Presence or Absence of OH Group in Resin Binder | Hydrogen-bonding Component Value $\gamma^h_2$ [mN/m] | Dispersive Component Value $\gamma^d_2$ [mN/m] |
|---|---|---|---|---|
| Sample A-1 | butyral resin | present | 6.76 | 22.54 |
| Sample A-2 | butyral resin | present | 1.63 | 23.42 |
| Sample A-3 | butyral resin, acrylic resin | present | 0.42 | 26.87 |
| Sample A-4 | butyral resin, acrylic resin | present | 5.75 | 21.19 |
| Sample A-5 | phenol resin, epoxy resin, butyral resin | present | 0.98 | 28.33 |
| Sample A-6 | polyol·blocked isocyanate-type urethane resin | present | 3.54 | 24.84 |
| Sample A-7 | epoxy resin, melamine resin | present | 5.43 | 25.15 |
| Sample A-8 | polyvinyl acetate resin | absent | 15.39 | 22.84 |
| Sample A-9 | polyethylene vinyl acetate resin | absent | 6.21 | 24.91 |
| sample A-10 | styrene-butadiene resin | absent | 7.32 | 21.77 |

Preparation of the Carbon Paste

Three graphite powder-containing graphite pastes were prepared as follows as the carbon paste.

[Sample G-1]

A graphite paste G-1 was prepared by kneading and stirring the following using a ball mill: 4.8% by weight of graphite powder, 32.5% by weight of a polyethylene vinyl acetate resin (NUC-3160), and 62.7% by weight of propylene glycol methyl ether acetate.

[Sample G-2]

A graphite paste G-2 was prepared by kneading and stirring the following using a ball mill: 8.3% by weight of graphite powder, 12.5% by weight of a novolac epoxy resin (YDF-2001 from the new Nippon Steel Chemical Co., Ltd.), 2.2% by weight of a curing agent (Hardener N from Nagashima Special Paint Co., Ltd.), and 77.0% by weight of 2-butoxy-ethanol.

[Sample G-3]

A graphite paste G-3 was prepared by kneading and stirring the following using a ball mill: 6.3% by weight of graphite powder, 4.0% by weight of butyral resin (BH-S:KS-5=1:1), and 89.7% of propylene glycol methyl ether acetate.

Analysis of the Carbon Layer

Each of the prepared samples was sprayed by a spray coating method on an alumina substrate and dried and/or cured to form a carbon layer that had a film thickness of approximately 20 μm after drying and/or curing. This was followed by calculation of the hydrogen-bonding component value $\gamma^h_1$ and the dispersive component value $\gamma^d_1$ by the method described above. These results are given in TABLE 2. TABLE 2 also provides the presence or absence of the hydroxyl group in the resin component as evaluated based on the previously indicated method.

TABLE 2

| Graphite Paste | Resin Binder | Presence or Absence of OH Group in Resin Binder | Hydrogen-bonding Component Value $\gamma^h_1$ [mN/m] | Dispersive Component Value $\gamma^d_1$ [mN/m] |
|---|---|---|---|---|
| Sample G-1 | polyethylene vinyl acetate resin | absent | 0.47 | 42.15 |
| Sample G-2 | novolac epoxy resin | present | 5.02 | 34.76 |
| Sample G-3 | butyral resin | present | 3.82 | 41.38 |

Experiments on the Carbon Layer and Conductive Layer Combinations

The contact resistance, which has the greatest influence on the ESR value, was measured for each of combinations of the prepared conductive pastes and carbon pastes.

Experimental Example 1

A carbon layer with a thickness of about 20 μm was formed on an alumina substrate using the graphite paste of sample G-1; a plurality of equally spaced 1 mm×20 mm fine-line patterns were formed thereon using the silver paste of sample A-1; and drying and/or curing was subsequently performed for 60 minutes at 150° C. to fabricate a sample substrate. A total of 50 of the same sample substrates were prepared in the same manner.

On each of the thus prepared 50 sample substrates, the contact resistance was measured based on the transmission line model (TLM) technique, and then a heat-cycle test was executed by repeating a thermal load test implemented at temperatures from −55° C. to 125° C. 300 times. The contact resistance was then re-measured on each of the 50 sample substrates on which the above heat-cycle test had been executed.

The "coefficient of variation (CV value)" and the "percentage change in contact resistance" were calculated as follows from the resulting data.

[coefficient of variation (CV value)]=[standard deviation on the contact resistance value after the heat-cycle test]/[average value of the contact resistance values after the heat-cycle test]×100     Equation (2)

[percent change in contact resistance (%)]=([average value of the contact resisstance values after the heat-cycle test]/[average value of the contact resistance values before the heat-cycle test]×100     Equation (3)

A larger coefficient of variation (CV value) indicates a larger variation in the contact resistance changes (and hence a larger variation in the ESR changes) due to the thermal shock, while a larger percent change in contact resistance indicates a larger deterioration in the contact resistance (and hence a larger deterioration in the ESR) due to the thermal history. A negative percent change in the contact resistance means that the ohmic contact has been improved by the thermal history.

The "coefficient of variation (CV value)" and the "percent change in contact resistance" obtained in Experimental Example 1 are given in TABLE 3. TABLE 3 also gives the presence/absence combination for the hydroxyl group in the resin components used in sample A-1 and sample G-1, the difference $\Delta\gamma^h$ ($=\gamma^h_2-\gamma^h_1$) between the hydrogen-bonding component values, and, for reference, the difference $\Delta\gamma^d$ ($=\gamma^d_2-\gamma^d_1$) between the dispersive component values.

TABLE 3

| | Combination of Samples | Combination of Presence or Absence of OH Group | Difference between Hydrogen-bonding Component Values $\Delta\gamma^h$ [mN/m] | Difference between Dispersive Component Values $\Delta\gamma^d$ [mN/m] | Coefficient of Variation CV Value | Percent Change in Contact Resistance (%) |
|---|---|---|---|---|---|---|
| *Example 1 | [A-1] × [G-1] | present × absent | 6.29 | −19.61 | 6.35 | 11.9 |
| Example 2 | [A-1] × [G-2] | present × present | 1.74 | −12.22 | 3.12 | −5.3 |
| Example 3 | [A-1] × [G-3] | present × present | 2.94 | −18.84 | 3.47 | −5.7 |
| *Example 4 | [A-2] × [G-1] | present × absent | 1.16 | −18.73 | 3.22 | 8.9 |
| *Example 5 | [A-2] × [G-2] | present × present | −3.39 | −11.34 | 4.75 | −0.2 |
| Example 6 | [A-2] × [G-3] | present × present | −2.19 | −17.96 | 3.32 | −5.2 |
| *Example 7 | [A-3] × [G-1] | present × absent | −0.05 | −15.28 | 2.35 | 5.8 |
| *Example 8 | [A-3] × [G-2] | present × present | −4.60 | −7.89 | 5.55 | −3.2 |
| *Example 9 | [A-3] × [G-3] | present × present | −3.40 | −14.51 | 4.52 | −3.1 |
| *Example 10 | [A-4] × [G-1] | present × absent | 5.28 | −20.96 | 6.32 | 3.1 |
| Example 11 | [A-4] × [G-2] | present × present | 0.73 | −13.57 | 2.64 | −7.0 |
| Example 12 | [A-4] × [G-3] | present × present | 1.93 | −20.19 | 2.98 | −4.8 |
| *Example 13 | [A-5] × [G-1] | present × absent | 0.51 | −13.82 | 2.93 | 7.4 |
| *Example 14 | [A-5] × [G-2] | present × present | −4.04 | −6.43 | 6.38 | 0.7 |
| Example 15 | [A-5] × [G-3] | present × present | −2.84 | −13.05 | 3.41 | −0.5 |
| *Example 16 | [A-6] × [G-1] | present × absent | 3.07 | −17.31 | 4.33 | 7.5 |
| Example 17 | [A-6] × [G-2] | present × present | −1.48 | −9.92 | 3.36 | 0.1 |
| Example 18 | [A-6] × [G-3] | present × present | −0.28 | −16.54 | 2.30 | 0.4 |
| *Example 19 | [A-7] × [G-1] | present × absent | 4.96 | −17.00 | 5.19 | 2.8 |
| Example 20 | [A-7] × [G-2] | present × present | 0.41 | −9.61 | 2.37 | −2.6 |
| Example 21 | [A-7] × [G-3] | present × present | 1.61 | −16.23 | 2.78 | 0.3 |
| *Example 22 | [A-8] × [G-1] | absent × absent | 14.92 | −19.31 | 8.02 | 12.6 |
| *Example 23 | [A-8] × [G-2] | absent × present | 10.37 | −11.92 | 5.39 | 7.2 |
| *Example 24 | [A-8] × [G-3] | absent × present | 11.57 | −18.54 | 8.63 | 9.6 |
| *Example 25 | [A-9] × [G-1] | absent × absent | 5.74 | −17.24 | 9.81 | 10.2 |
| *Example 26 | [A-9] × [G-2] | absent × present | 1.19 | −9.85 | 3.17 | 8.4 |
| *Example 27 | [A-9] × [G-3] | absent × present | 2.39 | −16.47 | 3.44 | 7.5 |
| *Example 28 | [A-10] × [G-1] | absent × absent | 6.85 | −20.38 | 7.53 | 1.5 |
| *Example 29 | [A-10] × [G-2] | absent × present | 2.30 | −12.99 | 2.69 | 2.7 |
| *Example 30 | [A-10] × [G-3] | absent × present | 3.50 | −19.61 | 5.85 | 2.4 |

Experimental Examples 2 to 30

The same tests and measurements as in Experimental Example 1 were carried out on the combinations of samples indicated in TABLE 3. These results are given in TABLE 3.

<Evaluation·Analysis>

The examples tagged with * in TABLE 3 are outside the scope of the present invention.

As is clear from this table, when just either the conductive layer or the carbon layer does not contain a hydroxyl group (or hydroxyl groups), the contact resistance undergoes a thermal history-induced increase, while in contrast, when both contain a hydroxyl group (or hydroxyl groups), the contact resistance either declines or, even if it increases, this is held to less than 1%.

In addition, when the absolute value of the difference $\Delta\gamma^h$ [mN/m] between the hydrogen-bonding component values is less than or equal to 3, the coefficient of variation value CV is not more than 3.5 and the thermal history-induced variation is thus strongly restrained; however, the coefficient of variation value CV undergoes a sharp increase when the absolute value of $\Delta\gamma^h$ [mN/m] exceeds 3.

INDUSTRIAL APPLICABILITY

The present invention can be applied to the solid electrolytic capacitor elements that are used in electronic components and electrical components.

EXPLANATION OF SYMBOLS 1 solid capacitor element
11 valve action metal sintered body (anode body)
12 oxide film (dielectric layer)
13 solid electrolyte layer
14 carbon layer
15 conductive layer

The invention claimed is:

1. A solid electrolytic capacitor element which is provided, on a surface of an anode body, with at least a dielectric layer, a solid electrolyte layer, a carbon layer containing a first resin component, and a conductive layer containing a second resin component, wherein
the first resin component and the second resin component both contain a hydroxyl group and
the difference $\Delta\gamma^h$ $(=\gamma^h{}_2-\gamma^h{}_1)$ between the hydrogen-bonding component value $\gamma^h{}_1$ [mN/m] of the surface of the carbon layer and the hydrogen-bonding component value $\gamma^h{}_2$ [mN/m] of the surface of the conductive layer is within the range of $-3 \leq \Delta\gamma^h \leq 3$ [mN/m].

2. The solid electrolytic capacitor element according to claim 1, wherein the first resin component and/or the second resin component is at least one selected from the group consisting of butyral resins, acrylic resins, epoxy resins, phenoxy resins, phenol resins, amino resins, and urethane resins.

3. The solid electrolytic capacitor element according to claim 2, wherein the conductive layer includes silver as a conductive component.

4. A method of manufacturing a solid electrolytic capacitor element which is provided with, on a surface of an anode body, at least a dielectric layer, a solid electrolyte layer, a carbon layer, and a conductive layer,
the method including:
a step of forming the carbon layer using a carbon paste containing a hydroxyl group-containing first binder resin; and
a step of forming, on the carbon layer, the conductive layer using a conductive paste containing a hydroxyl group-containing second binder resin, wherein
the carbon paste and the conductive paste are used in combination so that the difference $\Delta\gamma^h$ $(=\gamma^h{}_2-\gamma^h{}_1)$ between the hydrogen-bonding component value $\gamma^h{}_1$ [mN/m] of the surface of the carbon layer and the hydrogen-bonding component value $\gamma^h{}_2$ [mN/m] of the surface of the conductive layer is within the range of $-3 \leq \Delta\gamma^h \leq 3$ [mN/m].

5. The manufacturing method according to claim 4, wherein the first binder resin and/or the second binder resin is at least one selected from the group consisting of butyral resins, acrylic resins, epoxy resins, phenoxy resins, phenol resins, amino resins, and compositions that cure to provide urethane resins.

6. A conductive paste for forming, in a solid electrolytic capacitor element, a conductive layer that is disposed on a carbon layer containing a hydroxyl group-containing resin component, wherein
a binder resin contained in the conductive paste has a hydroxyl group, and
when $\gamma^h{}_1$ [mN/m] is the hydrogen-bonding component value of the surface of the carbon layer and $\gamma^h{}_2$ [mN/m] is the hydrogen-bonding component value of the surface of the conductive layer, the difference $\Delta\gamma^h$ $(=\gamma^h{}_2-\gamma^h{}_1)$ between these hydrogen-bonding component values is within the range of $-3 \leq \Delta\gamma^h \leq 3$ [mN/m].

7. The conductive paste according to claim 6, wherein the binder resin is at least one selected from the group consisting of butyral resins, acrylic resins, epoxy resins, phenoxy resins, phenol resins, amino resins, and compositions that cure to provide urethane resins.

* * * * *